United States Patent
Buter et al.

(10) Patent No.: US 9,526,265 B2
(45) Date of Patent: Dec. 27, 2016

(54) APPARATUS FOR THE PRODUCTION OF FROZEN CONFECTIONS

(71) Applicant: Conopco, Inc., Englewood Cliffs, NJ (US)

(72) Inventors: René Joachim Buter, Vlaardingen (NL); Ashvinikumar Vishnukumar Mudaliar, Rotterdam (NL); Georgios Tetradis-Mairis, Bedford (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 0 days.

(21) Appl. No.: 14/430,236

(22) PCT Filed: Aug. 28, 2013

(86) PCT No.: PCT/EP2013/067764
§ 371 (c)(1),
(2) Date: Mar. 23, 2015

(87) PCT Pub. No.: WO2014/048658
PCT Pub. Date: Apr. 3, 2014

(65) Prior Publication Data
US 2015/0245630 A1 Sep. 3, 2015

(30) Foreign Application Priority Data

Sep. 28, 2012 (EP) .................................... 12186509

(51) Int. Cl.
*A23G 9/04* (2006.01)
*A23G 3/02* (2006.01)
(Continued)

(52) U.S. Cl.
CPC ................. *A23G 1/22* (2013.01); *A23G 9/083* (2013.01); *A23G 9/18* (2013.01); *A23G 9/221* (2013.01);
(Continued)

(58) Field of Classification Search
CPC ........ A23G 9/083; A23G 9/221; A23G 9/222; A23G 9/18; A23G 9/20; A23G 9/28; A23G 1/205; A23G 1/105; A23G 1/22; A23G 3/023; A23G 3/0252; A23G 3/0268; F25D 3/105; F25D 3/107; F25D 3/11
(Continued)

(56) References Cited

U.S. PATENT DOCUMENTS 6,129,940 A * 10/2000 Leadbeater ............ A23G 1/205
425/237
2004/0071834 A1* 4/2004 Dyks .................... A23G 3/0236
426/100

FOREIGN PATENT DOCUMENTS

EP 0923875 6/1999
EP 1886580 2/2008
(Continued)

OTHER PUBLICATIONS

Arbuckle, Frozen Confections, Novelties, Fancy Molded Ice Creams, Ice Cream, Jan. 1, 1986, 297-312, ., Van Nostrand Reinhold, US.
(Continued)

*Primary Examiner* — Seyed Masoud Malekzadeh
(74) *Attorney, Agent, or Firm* — Foley & Lardner LLP

(57) ABSTRACT

A roller having a multiplicity of open moulding cavities on its surface, the roller being hollow with its cavity being partially filled with liquid nitrogen, characterized in that: A vacuum insulation compartment is located on each side of the roller. The vacuum insulation compartment, in radial cross section, presenting an outside generally plane and circular wall in the form of an annular disc, joint to a roller side wall by two portions having: a general sigmoid cross section for the portion at the peripheral part of the vacuum (Continued)

panel; a general sigmoid cross section for the portion at the central part of the vacuum panel.

4 Claims, 5 Drawing Sheets

(51) Int. Cl.
| | | |
|---|---|---|
| *A23G 1/22* | (2006.01) | |
| *A23G 9/08* | (2006.01) | |
| *A23G 9/22* | (2006.01) | |
| *A23G 9/18* | (2006.01) | |
| *F25D 3/10* | (2006.01) | |
| *A23G 1/20* | (2006.01) | |
| *A23G 1/10* | (2006.01) | |

(52) U.S. Cl.
CPC ............... *A23G 9/222* (2013.01); *F25D 3/107* (2013.01); *A23G 1/105* (2013.01); *A23G 1/205* (2013.01); *A23G 3/0236* (2013.01); *A23G 3/0252* (2013.01); *A23G 3/0268* (2013.01); *F25D 3/105* (2013.01)

(58) Field of Classification Search
USPC ........ 425/237, 363, 375, 408; 426/285, 512, 426/515, 565, 660
See application file for complete search history.

(56) References Cited

FOREIGN PATENT DOCUMENTS

| | | |
|---|---|---|
| JP | 62-091148 | 4/1987 |
| JP | 62091148 | 4/1987 |

OTHER PUBLICATIONS

Search Report in EP12186509, Mar. 13, 2013.
Search Report in PCTEP2013067764, Oct. 25, 2013.
Written Opinion in EP12186509, Mar. 13, 2013.
Written Opinion in PCTEP2013067764, Oct. 25, 2013.

\* cited by examiner

APPARATUS FOR THE PRODUCTION OF FROZEN CONFECTIONS

TECHNICAL FIELD

The present invention relates to the manufacture of frozen confections. In particular, it relates to the manufacture of these frozen confections using apparatus with forming elements and moulds.

BACKGROUND OF THE INVENTION

Manufacturing chocolate balls has been known for decades and various technologies based on cylindrical rollers have been proposed such as the one described in EP923875 which describes a pair of parallel rollers having cavities defined on the outer cylindrical surfaces, a depositing device depositing a solidifiable liquid such as chocolate onto said cylindrical surfaces, thus providing two separate parts of food articles. By counter rotating the rollers, the two surfaces move towards one another and join the two separate parts into one food product. The whole process is based on the fact each individual food article is linked to the others by a film, or a web, made out of the same food material. It is also relying on the fact that, on cooling, chocolate contracts and readily de-moulds from the cavities.

Whereas this process is adequate for manufacturing chocolate balls from a liquid base, it is totally inappropriate for the manufacturing of ice cream products wherein the cavities would be filled by a frozen aerated product. The main obstacles against transferring this technology to ice cream products are that the cavities must be at a low enough temperature, otherwise the ice cream fed into these cavities will melt (at least at the surface), but if the cavities are below 0° C., at a temperature where ice starts to form, then the ice cream will stick to the surface and will not be easily 'de-mouldable'.

Such problems are for example illustrated in JP62-91148 which attempts to propose a process for the manufacturing of ice balls while addressing the problem of ice sticking to the walls of the cavities and which can be described as follows.

When the corresponding cavities of the pair of rollers pass the point where they are the closest to one another, the frozen product in each cavity is not pressed hard enough against the contiguous product situated into the corresponding cavity on the other roller, when the cavities move again away from each other through the rotation of the rollers, the force linking the two half products is too weak in comparison with the adhesion between each half product and the cavity in which it is and thus it stays in the cavity and does not 'de-mould'. JP62-91148 addresses this problem by i) heating one of the roller with an internal circulation of hot liquid, ii) by providing ejection mechanisms in each cavity of the other roller, and iii) providing excess material proud of the roller surface. These ejection mechanisms allow for the two half products to be pressed together while heating one roller allows for demoulding the product.

This technology does not constitute a practical solution for the problem raised by attempting to produce frozen aerated products using a pair rollers since the need to effectively melt the surface of each product to allow for its de-moulding raises unacceptable hygiene issues. In other respect, the ejection mechanisms situated in each and every cavity of a roller are extremely complex, difficult to maintain, and again constitute a hygiene hazard.

More recently it has been proposed process for the manufacturing of frozen aerated products comprising;
providing two separate forming elements,
providing at least one open cavity on a surface of each forming element,
providing filling devices for filling said cavities with a frozen aerated material,
filling two cavities, one on each forming element, with a frozen aerated material,
wherein:
a. at least one of the cavities is filled with a frozen aerated product having an overrun of between 30% and 130%,
b. this product is then allowed to expand outside its cavity,
c. the two cavities are then moved opposite one another and the frozen aerated product in each cavity is pressed against the frozen aerated product in the other cavity.
d. The forming elements being cooled with liquid nitrogen and are at a temperature below −80° C., more preferably below −100° C.

Preferably, the two separate forming elements are a pair of parallel rollers wherein each roller has a multiplicity of open cavities on its surface, the rollers counter-rotating so that respective cavities in the two forming elements lie opposite one another and the frozen aerated product in a cavity of a first roller is pressed against the frozen aerated product in an opposite cavity of a second roller.

Each roller is hollow with its cavity being partially filled with liquid nitrogen so as to ensure cooling of the rollers.

Whereas such an apparatus is perfectly satisfactory with regards to the quality of the moulding process, it consumes, though sheer evaporation of the liquid nitrogen, a huge amount of liquid nitrogen which is in fact not used in the cooling process. Typically, in operation, less than 5% of the liquid nitrogen is effectively used to cool the moulds There is therefore a need for an apparatus which dramatically decreases the liquid nitrogen consumption and whereas thermal insulation could be seen as an obvious solution, the study leading to the present invention has shown that such a potential solution was full of problems due to the stress created by thermal deformation. In that respect, Von Mises stress are preferably be below 200 MPa (for a safety factor 2), more preferably below 100 MPa (for a safety factor 3) in all points of the roller.

Tests and Definitions

Frozen aerated product shall mean a frozen confection as described in ICE CREAM—Fourth Edition—W S Arbuckle—Chapman & Hall—pages 297 to 312.
Temperature of the rollers:
The roller temperature is measured by a resistance temperature probe situated 5 mm beneath the surface.
Von Misses stress
Von Mises Stress is a geometrical combination of all stresses (normal stresses in a three dimension and all 3 shear stresses) acting at a particular location. It is depending on temperature, and measured in Pascal.

BRIEF DESCRIPTION OF THE INVENTION

It is the object of the present invention to provide a roller having a multiplicity of open moulding cavities on its surface, the roller being hollow with an internal cavity, said cavity being partially filled with liquid nitrogen, characterised in that
a vacuum insulation compartment is located on each side of the roller, the vacuum insulation compartment, in radial cross section, presenting an outside generally plane and circular wall in the form of an annular disc, joint to a roller side wall by two portions having:
- a general sigmoid cross section for the portion at the peripheral part of the vacuum panel
- a general sigmoid cross section for the portion at the central part of the vacuum panel.

Preferably each sigmoid cross section is characterised by:
- a first curvature linked to the roller side and having a radius R1
- a straight portion
- a second curvature having a radius R2, linking the sigmoid cross section to the outside circular wall.

Preferably, the first curvature is linked to the roller side by an opposite curvature having a radius R4.

DETAILED DESCRIPTION OF THE DRAWINGS

The present invention will be further described with reference to the sole accompanying drawings wherein FIG. 1 represents a schematic view of an apparatus for carrying out the process according to the present invention.

DETAILED DESCRIPTION OF THE INVENTION

Figure 1:
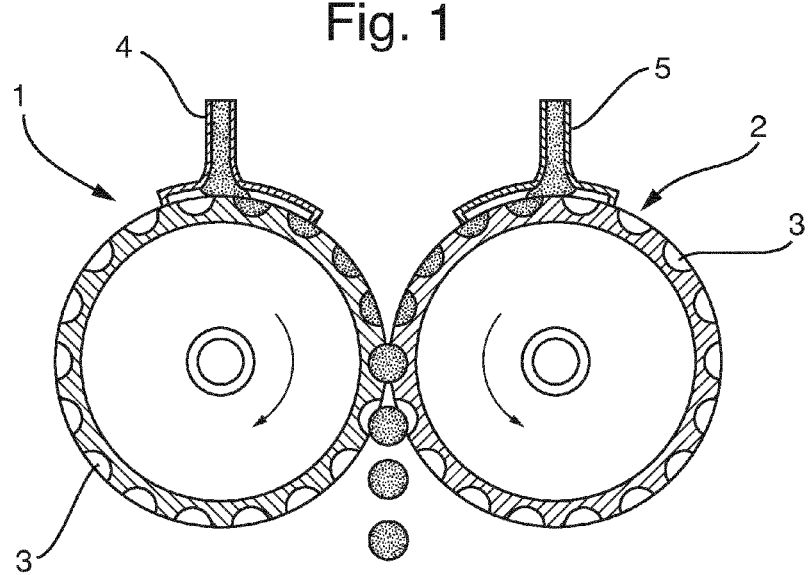

As disclosed in the accompanying drawing, the apparatus comprises a pair of parallel rollers 1 and 2 having mould cavities 3 defined on their outer cylindrical surfaces. A first filling device 4 is provided for supplying frozen aerated product into the mould cavities 3 of the first roller 1. A second filling device 5 is provided for supplying frozen aerated product into the mould cavities 3 of the second roller 2. As disclosed in FIG. 1, the first and second filling devices may be independent from one another, alternatively, there may be one single filling device with two outputs, one for each roller. Motor means, not shown, are arranged for counter rotating the two rollers, to move the two surfaces towards one another and to press the frozen aerated product in a cavity of the first roller against the frozen aerated product situated in a cavity of the second roller.

The two rollers which are adapted to counter-rotate, are positioned to touch each other. By 'touching each other', it is meant a clearance of less than 0.1 mm. The rollers must be refrigerated by circulating an appropriate refrigerating fluid, such as liquid nitrogen, in order to have, in operation, a temperature of below $-100°$ C., as measured by an internal probe 14 mm beneath the surface.

Figure 2:
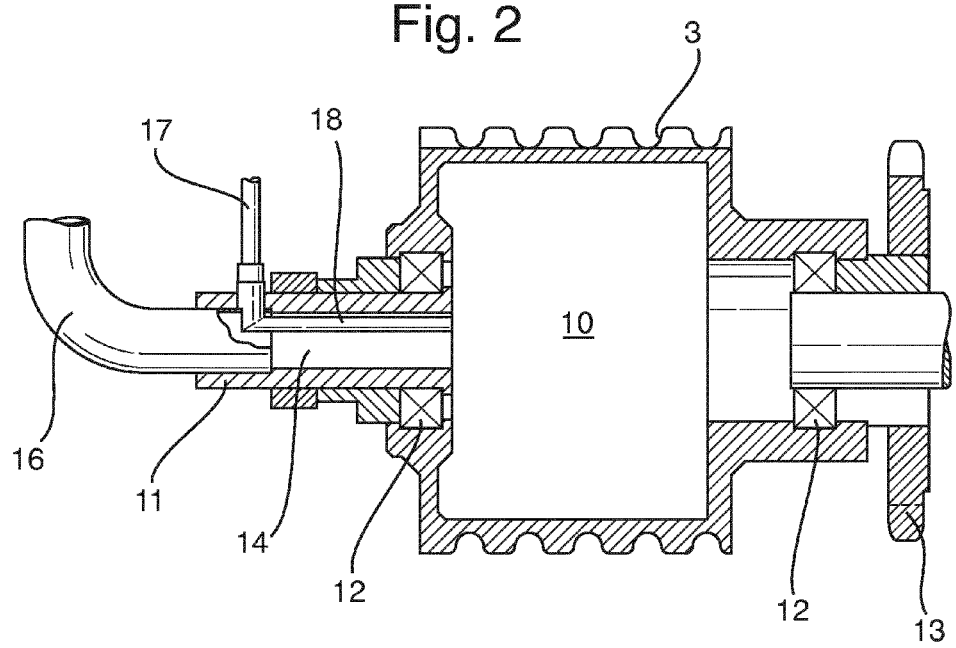
FIG. 2 represent a longitudinal cross section of a roller together with its cooling circuit for carrying out the process according to the invention.

As shown in FIG. 2, a roller has a cylindrical cavity 10 and is rotatably mounted on a fixed shaft 11 by means of bearings 12. On the roll there is fixedly mounted a sprocket 13 by means of which the roll is rotated. From one end of the shaft extends an axial pipe 14 through the shaft 11, opening in cavity 10. A pipe 16 is connected to the open end of pipe 14 opposite cavity 10. A separate pipe 17 extends through pipe 14. Pipe 17 is terminated in cavity 10 with a nozzle 18.

During operation a refrigerating medium, preferably liquid nitrogen, is supplied through the pipe 17 and sprayed through nozzle 18 in cavity 10 where it will thus cool the outer wall of the cavity and thence cool the mould cavities 3. The refrigerating medium is then gasified and led through pipe 14 out through pipe 16.

Initially both rollers run independently to reach a temperature of around $-160$ C. Once this temperature is reached, the two rollers are brought close to each other. Because of the shrinkage caused by the very low temperature the respective positions of the two rollers has to be checked at all time.

Ice cream is doused onto the mould cavities of the cold rollers. The two half moulds filled with ice cream come into contact, at this point a stick (not represented) is inserted and the fully formed ice cream is ejected.

Each of the two filling devices advantageously comprises a manifold mounted in the close proximity to the roller cylindrical surface, with a clearance, in operation of below 1 mm.

The two rollers can be made for example of aluminium or steel and the surface can be treated with a coating to improve hardness (e.g. chromium coating) or to improve mould release (e.g. PTFE). The mould cavities shapes follow the normal rules for demouldability. Preferably, at the level of mould cavity opening, the mould cavity wall is not substantially vertical. It thus allows a better expansion of the frozen aerated product and a better demouldability.

Example 1 (Comparative Example)

Figure 3:
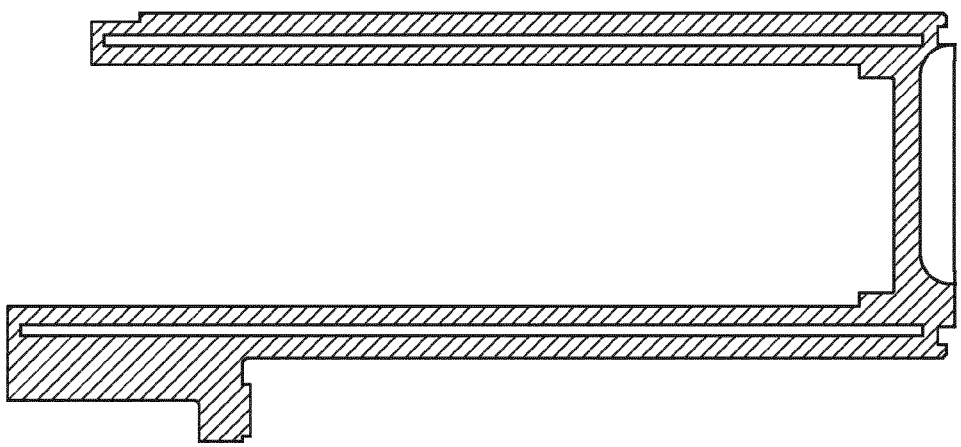
FIGS. 3 to 8 represent a roller cross section with various vacuum side panels which are not satisfactory FIG. 9 represent a roller cross section with a vacuum side panel according to the invention.
Figure 4:
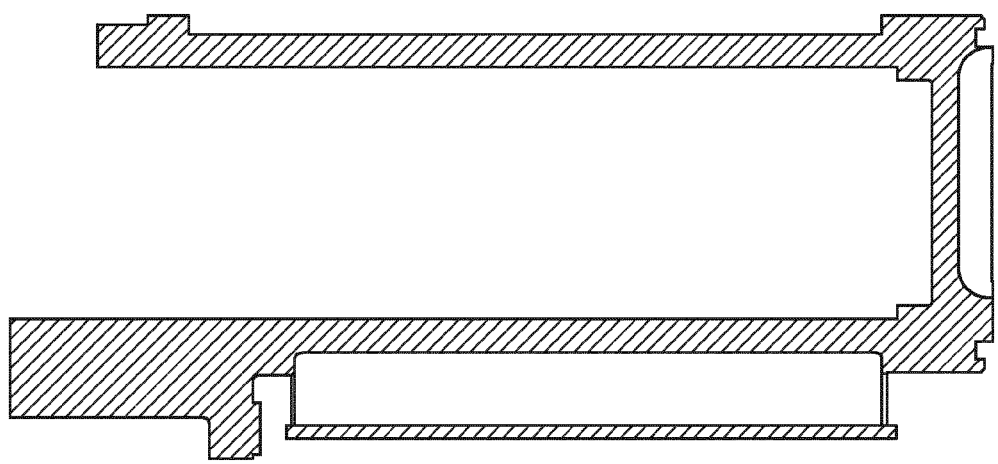
Figure 5:
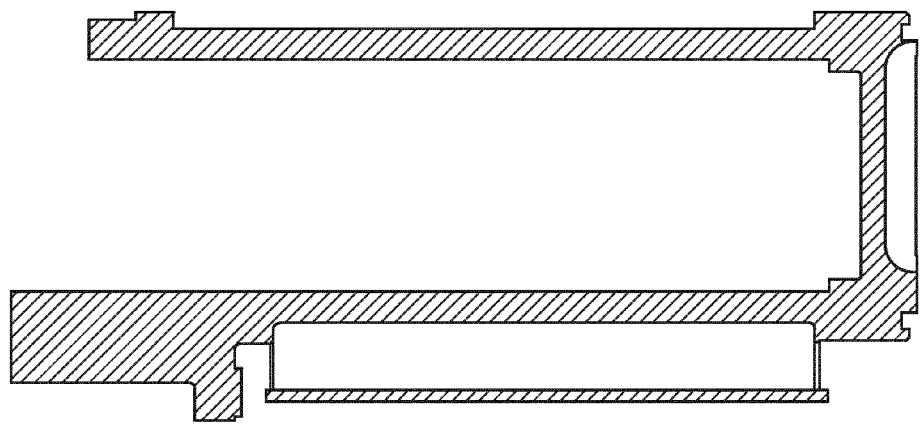

Various vacuum panels in square joints to the roller sides, as described in FIGS. 3, 4 and 5 were tested. The space between the roller side and the vacuum panel was at a vacuum pressure of less than 0.1 mbar.

The Von Mises Stress at the rim of the roller was between 1000 and 3000 the displacement being over 10 mm.

This was clearly not acceptable

Example 2 (Comparative Example)

Figure 6:
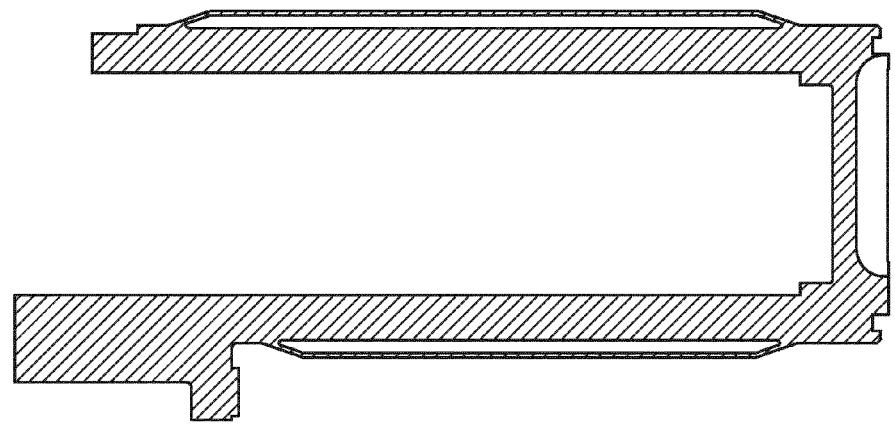

A vacuum panel with angle joints to the roller sides, as described in FIG. 6 was tested. The space between the roller side and the vacuum panel was at a vacuum pressure of less than 0.1 mbar.

The Von Mises Stress was 2,500 and the displacement was 2.6 mm.

This was clearly not acceptable.

Example 3 (Comparative Example)

Figure 7:
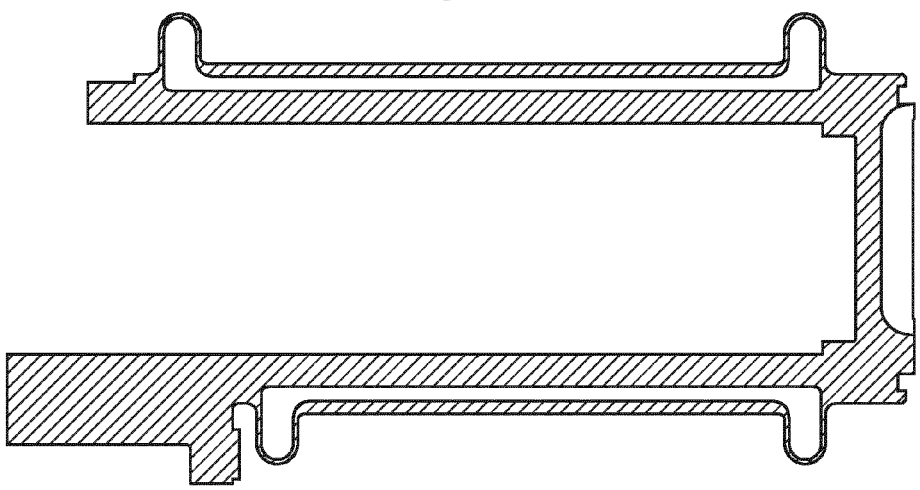

A vacuum panel with corrugated joints to the roller sides, as described in FIG. 7 was tested. The space between the roller side and the vacuum panel was at a vacuum pressure of less than 0.1 mbar.

The Von Mises Stress was reduced to 700. This was still not acceptable.

Example 4 (Comparative Example)

Figure 8:
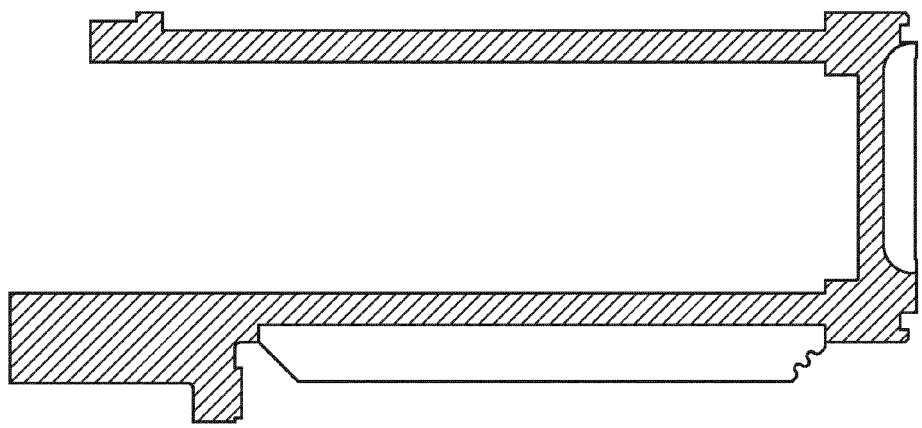

A vacuum panel with angle corrugated joints to the roller sides, as described in FIG. 8 was tested. The space between the roller side and the vacuum panel was at a vacuum pressure of less than 0.1 mbar.

The Von Mises Stress was reduced to 388. This was still not acceptable.

Example 5 (Invention)

Figure 9:
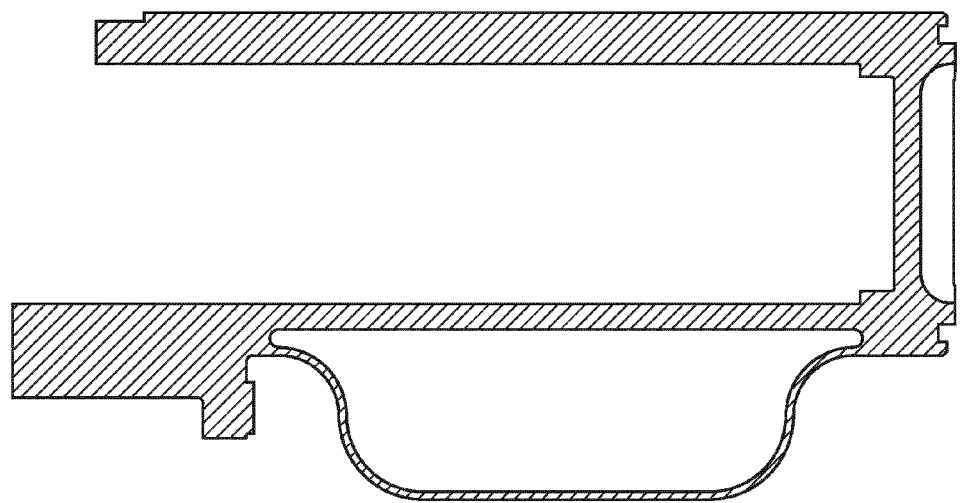

Vacuum panels as described in FIG. 9 were fitted to the roller side. The vacuum panel, in radial cross section, present an outside generally plane and circular wall in the form of an annular disc, joined to a roller side wall by two portions having:
- a general sigmoid cross section for the portion at the peripheral part of the vacuum panel
- a general sigmoid cross section for the portion at the central part of the vacuum panel.

Each sigmoid cross section is characterised by:
- a first curvature linked to the roller side and having a radius R1
- a straight portion
- a second curvature having a radius R2, linking the sigmoid cross section to the outside circular wall.

Preferably, the first curvature is linked to the roller side by an opposite curvature having a radius R4.

Preferably also the straight portion is substantially at a right angle with the outside circular wall.

The space between the roller side and the vacuum panel was at a vacuum pressure of less than 0.1 mbar.

Various geometries were tested which are summarised in the following table

The following variations for this design were tested in order to obtain the optimised solution:

| T1 (mm) | T2 (mm) | R1 (mm) | R2 (mm) | Angle | Von Misses (MPa) | Displacement (mm) |
|---|---|---|---|---|---|---|
| 10 | 5 | 30 | 30 | 90 | 276.7 | 2.5099 |
| 20 | 3 | 30 | 30 | 60 | 276.95 | 0.9964 |
| 20 | 5 | 30 | 10 | 90 | 262.3 | 1.0163 |
| 20 | 5 | 30 | 30 | 90 | 204.35 | 0.9925 |

The rollers and the vacuum panels were made of food grade stainless steel. With such a geometry the liquid nitrogen consumption can be reduced by 50% to 60%.

The invention claimed is:

1. A roller having a multiplicity of open moulding cavities on a roller's surface, the roller being hollow with an internal cavity, said internal cavity being partially filled with liquid nitrogen, further comprising:
    two vacuum panels, each vacuum panel is located on each side of the roller, wherein a space between each roller side and each vacuum panel is configured to be at a vacuum pressure of less than 0.1 mbar, and
    each vacuum panel, in radial cross section, presenting an outside generally plane and circular wall, joined to a roller side wall by two portions having:
    a general sigmoid cross section for one of the two portions at a peripheral part of each vacuum panel; and
    another general sigmoid cross section for the other one of the two portions at a central part of each vacuum panel.

2. The roller according to claim 1 wherein each sigmoid cross section is characterised by:
    a first curvature linked to a roller side and having a radius R1;
    a straight portion; and
    a second curvature having a radius R2, linking each sigmoid cross section to an outside of the circular wall.

3. The roller according to claim 2 wherein the first curvature is linked to the roller side by an opposite curvature having a radius R4.

4. The roller of claim 1, wherein the vacuum panels are configured to reduce liquid nitrogen consumption without subjecting the roller to a thermal deformation force greater than about 200 MPa.

* * * * *